(12) United States Patent
Okayama

(10) Patent No.: US 6,374,018 B1
(45) Date of Patent: Apr. 16, 2002

(54) OPTICAL SWITCH, METHOD OF OPERATING OPTICAL SWITCH, AND METHOD OF DESIGNING OPTICAL SWITCH

(75) Inventor: Hideaki Okayama, Tokyo (JP)

(73) Assignee: Oki Electric Industry Co., Ltd. (JP)

( * ) Notice: Subject to any disclaimer, the term of this patent is extended or adjusted under 35 U.S.C. 154(b) by 0 days.

(21) Appl. No.: 09/531,964

(22) Filed: Mar. 21, 2000

(30) Foreign Application Priority Data

Jul. 13, 1999 (JP) .......................................... 11-198420

(51) Int. Cl.$^7$ ................................................ G02B 6/42
(52) U.S. Cl. ........................................... 385/40; 385/16
(58) Field of Search .............................. 385/40, 16, 14, 385/8, 9, 10, 2, 130, 131

(56) References Cited

U.S. PATENT DOCUMENTS 6,233,377 B1 * 5/2001 Keil et al. ..................... 385/16

OTHER PUBLICATIONS

R.C. Alferness, "Polarization–Independent Optical Directional Coupler Switch Using Weighted Coupling", Appl. Phys. Lett. 35(10), Nov. 15, 1979, pp. 748–750 (American Institute of Physics).

* cited by examiner

Primary Examiner—Phan T. H. Palmer
(74) Attorney, Agent, or Firm—Venable; James R. Burdett

(57) ABSTRACT

An optical switch in which operational ranges of both a bar state and a cross state are wide is provided. By applying voltages of +V, −V, −V and+V independently to a first electrode 20A, a second electrode 20B, a third electrode 20C and a fourth electrode 20D, switching control to the bar state or the cross state is carried out.

14 Claims, 6 Drawing Sheets

OPTICAL SWITCH, METHOD OF OPERATING OPTICAL SWITCH, AND METHOD OF DESIGNING OPTICAL SWITCH

BACKGROUND OF THE INVENTION

Field of the Invention

The present invention relates to an optical switch, and in particular, to an optical switch which electrically controls the direction in which an optical signal proceeds, and to a method of operating the optical switch, and a method of designing the optical switch.

Conventionally, in the field of optical communications, optical switches which electrically control the direction in which the optical signal proceeds have been used. One example of such an optical switch is a reversed Δβ direction coupler optical switch.

The structure of a reversed Δβ direction coupler optical switch will be discussed hereinafter with reference to FIG. 7. FIG. 7 is a plan view which illustrates the main structural portions, i.e., only the waveguide portions and electrode portions, of a reversed Δβ direction coupler optical switch 100 (hereinafter "switch 100").

The optical switch 100 comprises a linear first waveguide 102, a linear second waveguide 104 which is disposed parallel to the waveguide 102, a linear first electrode 106 and a linear second electrode 108 which are disposed on the first waveguide 102 so as to be spaced apart from each other, and a linear third electrode 110 and linear fourth electrode 112 which are disposed on the second waveguide 104 so as to be spaced apart from each other. The first electrode 106 and the third electrode 110 oppose one another, whereas the second electrode 108 and the fourth electrode 112 oppose one another.

A coupling arises between the respective propagation modes of the first waveguide 102 and the second waveguide 104. While the polarity (e.g., positive) of the voltage with respect to a given reference potential, which voltage is applied to the first electrode 106 and the fourth electrode 112, and the polarity (e.g., negative) of the voltage with respect to a given reference potential, which voltage is applied to the second electrode 108 and the third electrode 110 are reversed, by controlling the magnitudes of these voltages, for example, an optical signal inputted from an input port P101 is outputted from either an output port P103 (a so-called "bar state") or an output port P104 (a so-called "cross state").

The range of values of the voltages which are applied to the electrodes and which are needed in order to bring the optical switch 100 into the cross state is broad. (Hereinafter, these values are referred to as "cross voltage values".) Namely, the operational range of the cross state is broad. Therefore, the applied voltages can be easily set to cross voltages, and as a result, switching to the cross state can be carried out stably.

However, the range of values of the voltages which are applied to the electrodes and which are needed in order to bring the optical switch 100 into the bar state is narrow. (Hereinafter, these values are referred to as "bar voltage values".) Namely, the operational range of the bar state is narrow. Therefore, it is difficult to set the applied voltages to bar voltages. As a result, even if attempts are made to switch the optical switch 100 to the bar state, a problem arises in that the optical signal leaks in the cross direction.

An example of another optical switch is disclosed in Applied Physics Letters, Vol. 35, No. 10, November 1979, pp. 748–750. In accordance with the structure of this optical switch (which is referred to hereinafter as "the second optical switch"), a first waveguide is a linear waveguide, whereas a second waveguide is a gently curved waveguide which is convex toward the first waveguide. Electrodes are provided for the first waveguide and the second waveguide. Switching is carried out by independently controlling the voltages which are applied to these electrodes.

The range of bar voltage values for the second optical switch is broad. Namely, the operational range of the bar state is broad. Accordingly, it is easy to set the applied voltages to bar voltages. As a result, switching to the bar state can be carried out stably.

However, the range of cross voltage values in the second optical switch is narrow. Namely, the operational range of the cross state is narrow. As a result, it is difficult to set the applied voltages to cross voltages. As a result, even if attempts are made to switch to the cross state, a problem arises in that the optical signal leaks in the bar direction.

SUMMARY OF THE INVENTION

Thus, an optical switch in which the operational range of the bar state is broad and the operational range of the cross state is broad is desired. Further, a method of operation of such an optical switch and a method of designing such an optical switch is desired.

In order to achieve the above objects, the present invention provides an optical switch for outputting an optical signal in different states, comprising: (a) first and second waveguides each including a propagation mode, the waveguides having a plurality of mode coupling regions permitting coupling between propagation modes and a plurality of non mode coupling regions where substantially no coupling arises between propagation modes of the waveguides, the mode coupling regions being opposing portions of the waveguides, and the non mode coupling regions also being opposing portions of the waveguides, wherein the opposing portions of the mode coupling regions are nearer to one another relative to the opposing portions of the non mode coupling regions; and (b) a plurality of electrodes spaced apart from one another, wherein the electrodes are disposed along at least the first waveguide.

In accordance with this structure, as will be explained later, operational ranges of the bar state and the cross state are made wide by appropriately adjusting the voltages of the respective electrodes. Accordingly, switching to the bar state or to the cross state is stable.

In this invention, preferably, the electrodes are disposed along the first waveguide and the second waveguide, with the electrodes disposed along the first waveguide opposing, in a one-to-one relationship, the electrodes disposed along the second waveguide. Or, an electrode is provided at mode coupling regions, and no electrode is provided at non mode coupling regions.

When operating the above optical switch, preferably, when the electrodes are disposed along only one of the first and second waveguides, voltages are applied independently to the respective electrodes, and the polarities of the voltages are successively reversed, with respect to a given reference potential, in the order in which the electrodes are arranged. Or, when electrodes are disposed along the first and second waveguides, voltages are applied independently to the respective electrodes, and the polarities of the voltages are successively reversed, with respect to a given reference potential, in the order in which the electrodes are disposed in a line. Further, absolute values of differences between the reference potential and a potential of each of the electrodes disposed so as to oppose one another along the first and second waveguides are equal.

In accordance with such methods, the operational ranges of the bar state and the cross state are both broad. Accordingly, switching to the bar state or to the cross state is stable.

In the present invention, preferably, at least one of the waveguides includes a periphery having at least one curve. Or, the first and second waveguides each include a periphery having at least one curve with a convex section, with the convex section of the curve of each waveguide opposing the convex section of the curve of the other waveguide.

The structures of the first and second waveguides are substantially the same as the structure of a waveguide of a conventionally known optical wavelength filter. Accordingly, it is easy to design the waveguide. Further, the unit curve may be, for example, a substantially cycloid curve, or may be a substantial sine curve.

Further, in the present invention, preferably, the waveguides substantially mirror one another.

In order to achieve the above-described objects, the present invention also provides a method for designing an optical switch from an optical wavelength filter having at least one electrode and first and second waveguides with a plurality of portions opposing one another across a space, with the space between one opposing portion being less relative to the space between another opposing portion, at least one of the waveguides having a section with a relief-type grating structure, and another section with a relief-type grating structure reversed relative to the other grating structure for optical-wave splitting, the method comprising the steps of: (a) for the section with a relief-type grating structure that is not reversed, replacing the grating structure with an electrode; and (b) reversing a voltage potential applied to each electrode in accordance with the reversed relief-type grating structure.

Or, in designing an optical switch from an optical wavelength filter, the following method may be used.

A method for designing an optical switch from a direction coupler type optical wavelength filter having a first waveguide and a second waveguide, each waveguide having a non mode coupling region with a length, the length being different in each waveguide, the method comprising the steps of: (a) modifying the filter to have first and second waveguides of substantially the same length in the non mode coupling regions; (b) placing electrodes along at least one of the waveguides; and (c) independently controlling voltages applied to the electrodes.

DESCRIPTION OF THE PREFERRED EMBODIMENTS

Figure 1:
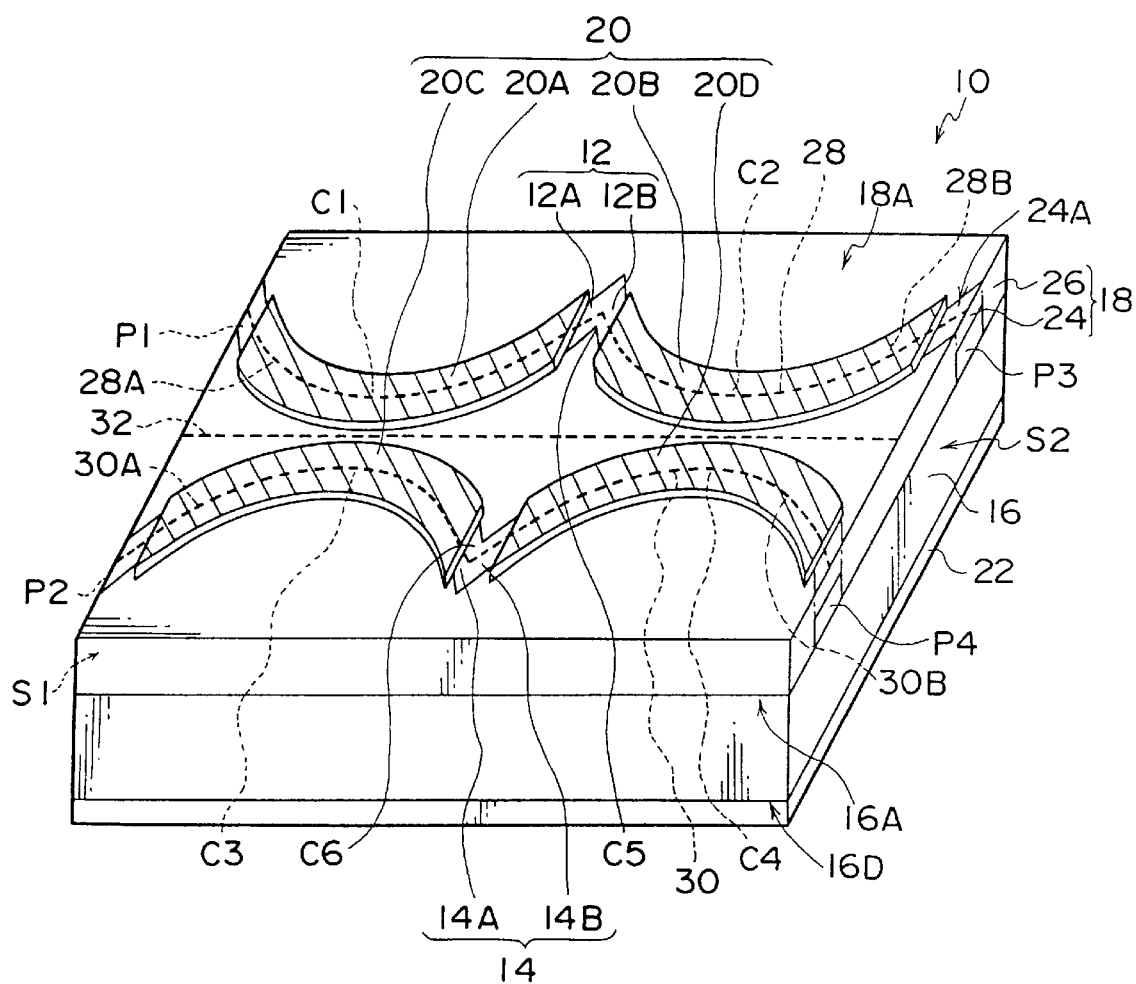
FIG. 1 is a perspective view illustrating the structure of an optical switch.

Hereinafter, embodiments of an optical switch of the present invention will be described with reference to the drawings. In the drawings, the sizes, configurations and positional relationships of the respective structural components are drawn schematically to the extent that the present invention can be readily appreciated, and it is thus to be understood that the present invention is not limited to these illustrated examples. Further, in the following explanation, the numerical values are merely examples, and the present invention is not to be limited to these values.

First Embodiment

First, the overall structure of an optical switch 10 which is one example of the present invention will be described hereinafter with reference to FIGS. 1 and 2.

Figure 2:
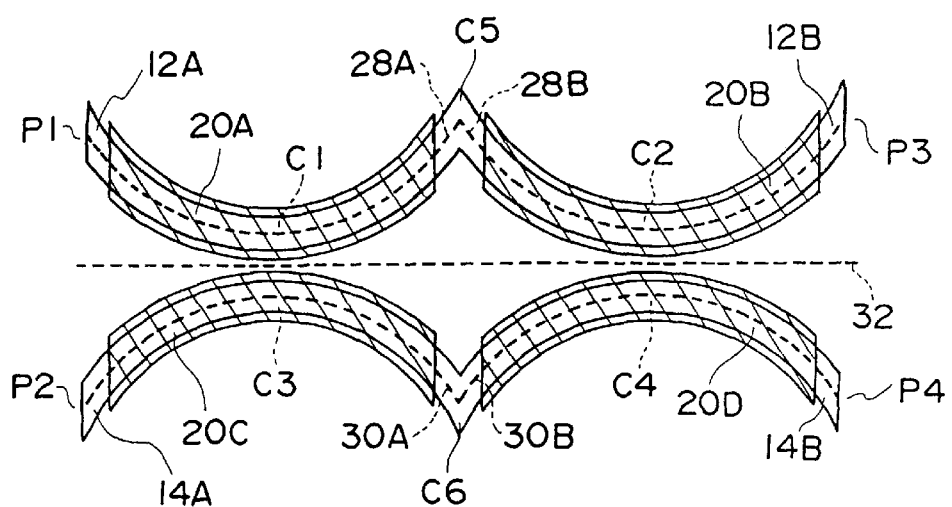
FIG. 2 is a plan view illustrating only waveguides and electrodes of the optical switch.

FIG. 1 is a perspective view illustrating the structure of the optical switch. FIG. 2 is a plan view which illustrates only waveguides and variable voltage electrodes of the optical switch.

The optical switch 10 includes a first waveguide 12 and a second waveguide 14 which are for propagating an optical signal, a substrate 16 and a clad portion 18 which confine the optical signal off in either the first waveguide 12 or the second waveguide 14, a variable voltage electrode group 20 (hereinafter, "electrodes 20") for controlling switching of the direction in which the optical signal proceeds, and an ground electrode 22. The first waveguide 12 and the second waveguide 14 are interposed between the substrate 16 and the clad portion 18. The clad portion 18 is interposed between the electrodes 20 and the ground electrode 22. In FIG. 1, in order to emphasize the contours of the first waveguide 12 and the second waveguide 14, the border lines thereof are illustrated by solid lines on a main surface 18A of the clad portion 18.

The optical switch 10 has four ports, a first port P1, a second port P2, a third port P3, and a fourth port P4, for inputting and outputting optical signals. The first port P1 and the third port P3 are separately connected to end portions of the first waveguide 12. The second port P2 and the fourth port P4 are separately connected to end portions of the second waveguide 14. The first port P1 and the second port P2 exist within the same end surface S1 of the optical switch 10. The third port P3 and the fourth port P4 exist within an end surface S2 which is opposite the end surface S1. For example, after an optical signal is inputted from the first port P1 (or the second port P2), the optical signal is propagated through the first waveguide 12 and the second waveguide 14, and is outputted from the third port P3 or the fourth port P4. The electrodes 20 are used for the switching to the third port P3 (i.e., the bar state) or to the fourth port P4 (i.e., the cross state).

Next, the steps for manufacturing the optical switch 10 will be described.

A substrate having an electrooptical effect is used as the substrate 16. The substrate 16 is formed from, for example, an organic material, a ferroelectric, glass, InP, LiNbO$_3$, or the like. A core layer (e.g., non-doped InGaAsP) and a first clad layer 24 (e.g., p-InP) are grown successively on a main surface 16A of the substrate 16.

Next, the core layer is etched by, for example, a reactive ion etching process (RIE process), such that a core for the first waveguide 12 and a core for the second waveguide 14 are respectively formed. In the present structural example, the widths and the heights of the cores for the first waveguide 12 and the second waveguide 14 are fixed values and are the same for the first and second waveguides 12 and 14. Simultaneously, the first clad layer 24 is etched so as to cover only the top portions of the first waveguide 12 and the second waveguide 14. The etched first clad layer 24 forms a portion of the clad portion 18.

Next, the ground electrode 22 which has a surface having the same configuration as a reverse surface 16D of the substrate 16 is formed on the reverse surface 16D.

Next, the earth electrode 22 which has a surface having the same configuration as a reverse surface 16D of the substrate 16 is formed on the reverse surface 16D.

Then, the electrodes 20 are respectively adhered, along the first waveguide 12 and the second waveguide 14, onto a main surface 24A of the first clad layer 24 at the top portions of the first waveguide 12 and the second waveguide 14. In this way, the optical switch 10 is completed.

Next, the characteristic structure of the optical switch 10 will be described with reference to FIGS. 1 and 2.

First, the central lines of the first waveguide 12 and the second waveguide 14 are defined as a first central line 28 and a second central line 30. The waveguide regions where the distance between the first waveguide 12 and the second waveguide 14 becomes locally extremely large (as will be described later) are defined as extremely large regions. The waveguide regions where the distance becomes locally extremely small (as will be described later) are defined as extremely small regions. The regions of the waveguides at which a coupling is generated between the propagation modes of the first waveguide 12 and the second waveguide 14 are defined as mode coupling regions. The regions of the waveguides at which substantially no coupling is generated between the propagation modes are defined as non mode coupling regions.

The local extremely large point of an arbitrary function f(z) is a point c wherein $f(z) \leq f(c)$ for all z within a neighborhood of c. The local extremely small point of an arbitrary function f(z) is a point c wherein $f(z) \geq f(c)$ for all z within a neighborhood of c.

In the present invention, the first waveguide 12 and the second waveguide 14 are provided so as to have portions which are close to the other waveguide and portions which are far form the other waveguide. The conditions for the operational ranges of the cross state and the bar state to simultaneously become broad are that the first waveguide 12A and the second waveguide 12B each have a plurality (two in the present structural example, as will be described later) of extremely small regions, and that the extremely small regions are mode coupling regions, while the extremely large regions may be mode coupling regions or non mode coupling regions.

In the present structural example, the first central line 28 is a curve at which a first unit curve 28A and a second unit curve 28B are connected in series. The first unit curve 28A and the second unit curve 28B in the present structural example are cycloid curves of substantially one cycle. Here, the region of the first waveguide 12 including the first unit curve 28A is defined to be a first region 12A. A region of the first waveguide 12 including the second unit curve 28B is defined to be a second region 12B. The first region 12A is connected to the first port P1. The second region 12B is connected to the third port P3.

A second center line 30 is a curve at which a third unit curve 30A and a fourth unit curve 30B are connected in series. In this structural example, the third unit curve 30A and the fourth unit curve 30B are substantially one cycle of a cycloid. Here, the region of the second waveguide 14 including the third unit curve 30A is defined to be a third region 14A. A region of the second waveguide 14 including the fourth unit curve 30B is defined to be a fourth region 14B. The third region 14A is connected to the second port P2. The fourth region 14B is connected to the fourth port P4.

The first central line 28 and the second central line 30 are disposed so as to have line symmetry about a third central line 32 disposed therebetween.

Accordingly, the extremal value portions of the first unit curve 28A and the third unit curve 30A are the portions of these unit curves which are closest to each other. Thus, a first extremal value portion C1 of the first region 12A and a third extremal value portion C3 of the third region 14A are extremely small regions (mode coupling regions). As the first region 12A and the third region 14A move away from the first extremal value portion C1 and the third extremal value portion C3 respectively, the mode coupling weakens.

The extremal value portions of the second unit curve 28B and the fourth unit curve 30B are the portions of these unit curves which are closest to each other. Thus, a second extremal value portion C2 of the second region 12B and a fourth extremal value portion C4 of the fourth region 14B are extremely small regions (mode coupling regions). As the second region 12B and the fourth region 14B move away from the second extremal value portion C2 and the fourth extremal value portion C4 respectively, the mode coupling weakens.

The first waveguide 12 is provided with two extremely small regions (i.e., the first extremal value portion C1 and the second extremal value portion C2). The second waveguide 14 is provided with two extremely small regions (i.e., the third extremal value portion C3 and the fourth extremal value portion C4).

The connected portion of the first unit curve 28A and the second unit curve 28B, and the connected portion of the third unit curve 30A and the fourth unit curve 30B, are the portions at which the first central line 28 and the second central line 30 are the furthest apart from each other. Accordingly, a fifth extremal value portion C5, which is the connected portion of the first region 12A and the second region 12B, and a sixth extremal value portion C6, which is the connected portion of the third region 14A and the fourth region 14B, are extremely large regions.

In the present structural example, the first unit curve 28A, the second unit curve 28B, the third unit curve 30A and the fourth unit curve 30B all have the same configuration. Thus, the first region 12A, the second region 12B, the third region 14A and the fourth region 14B all have the same configuration.

The first electrode 20A, the second electrode 20B, the third electrode 20C and the fourth electrode 20D are provided along the first region 12A, the second region 2B, the third region 14A, and the fourth region 14B, respectively, such that the entire region is included in the corresponding electrode. The first electrode 20A and the second electrode 20B are not connected at the fifth extremal value portion C5 (an extremely large region). The third electrode 20C and the fourth electrode 20D are not connected at the sixth extremal value portion C6 (an extremely large region). Accordingly, the first electrode 20A and the third electrode 20C oppose each other in a one-to-one relationship across the third central line 32. Further, the second electrode 20B and the fourth electrode 20D oppose each other in a one-to-one relationship across the third central line 32.

By applying voltages of +V, −V, −V, and +V to the first electrode 20A, the second electrode 20B, the third electrode 20C, and the fourth electrode 20D, respectively, for example, if the voltage is positive (i.e., if there is a forward direction bias), the refractive index changes due to the plasma effect. If the voltage is negative (i.e., if there is a reverse direction bias), the refractive index changes due to the electrooptic effect. Switching control (switching to the cross state or to the bar state) can be effected by utilizing these changes in the refractive index. These voltages are relative values with respect to a reference potential. In the present example, the reference potential is the potential of the ground electrode 22.

The voltage is the same as the pattern of a voltage applied to the electrode of a conventional reversed Δβ direction coupler. Usually, voltages of +V1, −V2, −V1 and +V2 are applied to the first electrode 20A, the second electrode 20B, the third electrode 20C, and the fourth electrode 20D, respectively. However, in the present structural example, as described above, because the first region 12A, the second region 12B, the third region 14A and the fourth region 14B all have the same configuration, V1=V2 in consideration of the symmetry.

Next, the manner in which the optical signal at the optical switch 10 propagates will be described.

For example, when an optical signal is inputted from the first port P1 and is outputted from the fourth port P4 (i.e., the cross state), first, voltage is applied such that the optical signal is divided in two at the exits (the fifth extremal value portion C5 and the sixth extremal value portion C6) of the first stage (the first region 12A and the third region 14A). In the second stage (the second region 12B and the fourth region 14B), voltage of the sign opposite the sign of the voltage in the first stage, is applied. Thus, through processes opposite to those of the first stage, the optical power moves to the second waveguide 14, and as a result, the optical signal is outputted from the fourth port P4.

When an optical signal is inputted from the first port P1 and is outputted from the third port P3 (i.e., the bar state), the voltage is adjusted such that the entire optical signal returns to the first waveguide 12 at the exits of the first stage. In the second stage, the same processes are repeated, and as a result, the optical signal exits from the third port P3.

Figure 3:
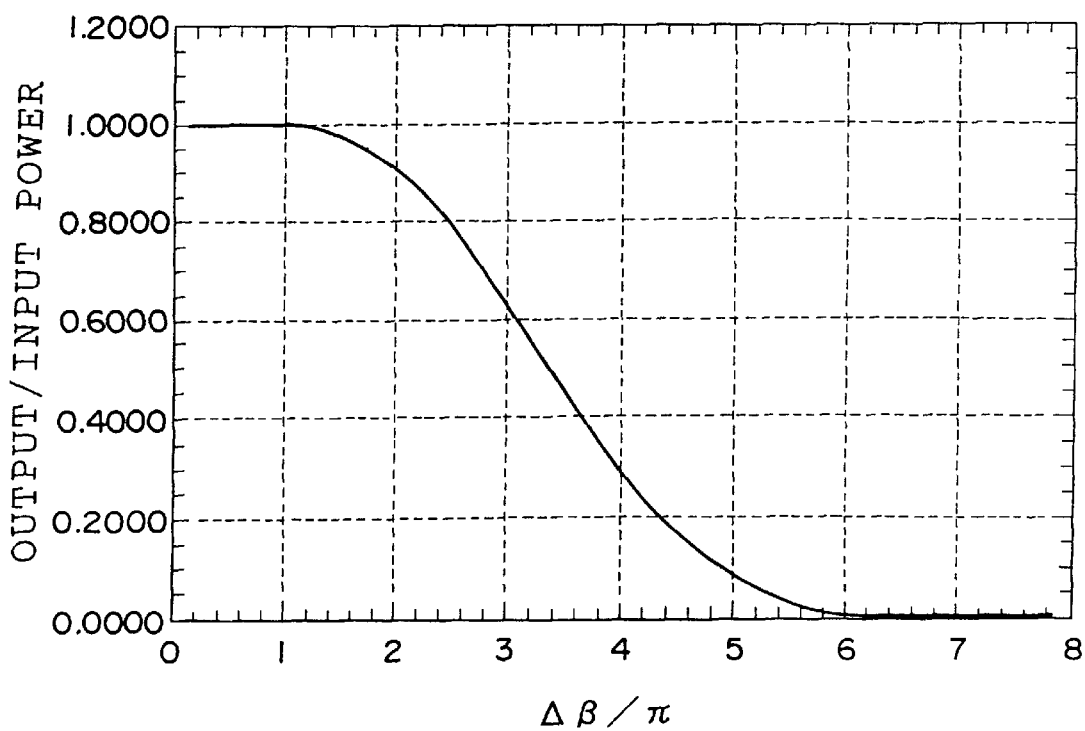
FIG. 3 is a graph illustrating the results of output/input power simulation of the optical switch.

FIG. 3 is a graph illustrating the results of simulation of output/input power of the optical switch. Along the vertical axis is plotted the ratio of the power of the optical signal outputted from the fourth port P4 to the power of the optical signal inputted to the first port P1 (i.e., output/input power). Δβ/π is plotted along the horizontal axis.

Here, Δβ (a dimensionless parameter) expresses the difference between the propagation constants β of the first waveguide 12 and the second waveguide 14. The propagation constant β is defined by the following formula (1):

$$\beta = (2\pi/\lambda) \cdot n \quad (1)$$

wherein n is an equivalent refractive index of the core. Because the wavelength λ of the optical signal is constant, $$\Delta\beta = (2\pi/\lambda) \cdot \Delta n \quad (2).$$

Namely, the difference Δβ in propagation constants is proportional to the equivalent refractive index n. The equivalent refractive index n is a function of the angle of incidence of the optical signal onto the waveguide and the refractive index of the core. In the present structural example, as described above, because the width and the height of the core are fixed values, the angle of incidence of the optical signal onto the waveguide is also fixed. Accordingly, the amount of change Δn in the equivalent refractive index n can be considered to be the amount of change in the refractive index of the core. This amount of change in the refractive index of the core is proportional to the magnitude of the voltage applied to the electrode. Accordingly, the difference Δβ in the propagation constants can be considered to be proportional to the magnitude of the voltage applied to the electrode.

In this simulation, the maximum value of a coupling coefficient κ (the overlapping integral of the propagation mode of the first waveguide 12 and the propagation mode of the second waveguide 14 (as will be described later)), is set to be π/2+0.03.

In accordance with the results of this simulation, in the range of 0 to 1 on the horizontal axis, the output/input power is 1. Namely, only the cross state (output from the fourth port P4) exists. In the range from 6.4 and above on the horizontal axis, the output/input power is 0. Namely, only the bar state (output from the third port P3) exists. The operational ranges of the cross state and the bar state are both broad. Accordingly, switching to the cross state or to the bar state can be carried out stably.

The optical switch 10 is designed from an optical wavelength filter on the basis of the following theory. The method of designing the optical switch 10 from an optical wavelength filter will be described hereinafter with reference to FIG. 4.

Figure 4:
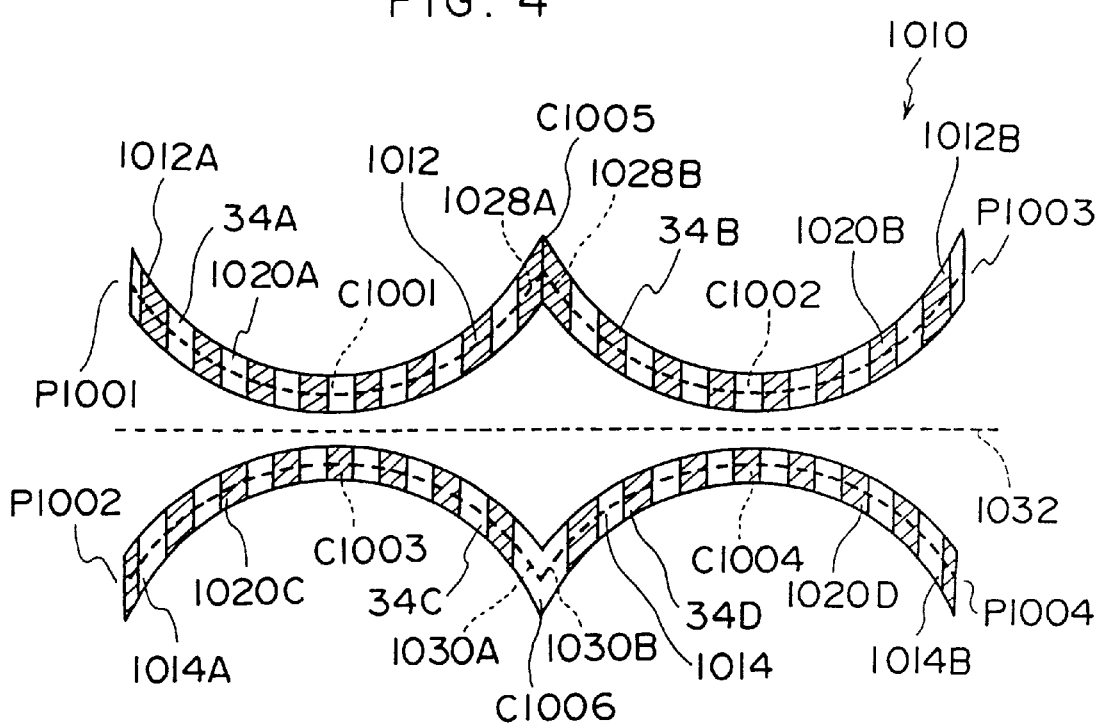
FIG. 4 is a plan view illustrating only waveguides of an optical wavelength filter.

FIG. 4 is a plan view illustrating only the waveguide portions of an optical wavelength filter.

An optical wavelength filter 1010 is an element using a (conventional) direction coupler having grating. The structures of the wavelength filer 1010 are basically the same as the structures of the optical switch 10. When the structures are the same, the structural portions of the wavelength filter 1010 will be designated by reference numerals which are those of the structural portions of the optical switch 10 to which 1000 has been added. (For example, the first waveguide 12 in the optical switch 10 corresponds to a first waveguide 1012 in the wavelength filter 1010.) In FIG. 4, the hatched regions and white regions shown in the first waveguide 1012 and a second waveguide 1014 are concave portions and convex portions, respectively. The grating is a so-called relief-type grating. Namely, the surfaces of the first waveguide 1012 and the second waveguide 1014 are concave- and -convex structures.

In the present structural example, the cycle of the grating is constant.

At a fifth extremal value portion C1005, the repeating pattern of phases of a first grating 34A in a first region 1012A, and the repeating pattern of phases of a second grating 34B at a second region 1012B, are reversed. Similarly, at a sixth extremal value portion C1006, the repeating pattern of phases of a third grating 34C in a third region 1014A, and the repeating pattern of phases of a fourth grating 34D at a fourth region 1014B, are reversed. In the present structural example, "repeating pattern of the phases of the grating" means a pattern in which concave portions and convex portions are arranged. "The repeating patterns of the phases of the grating are reversed" means that the convex and concave portions are reversed (the "reverse" of concave/convex/convex/concave . . . is . . . convex/concave/concave/convex . . . ).

When the phases of the first grating 34A and the third grating 34C are seen from a direction (hereinafter, "direction H") orthogonal to the longitudinal direction of the wavelength filter 1010, the phases of the first grating 34A and the third grating 34C are reversed. Further, when viewed from the direction H, the phases of the second grating 34B and the fourth grating 34D are reversed.

Next, the manner in which the optical signal at the optical wavelength filter 1010 propagates will be described. A case will be described in which, for example, a multiple optical signal of wavelengths λ1 and λ2 is inputted from a first port P1001, and thereafter, a wave-split first optical signal having the one wavelength λ1 is outputted from a fourth port P1004 (cross direction), and a wave-split second optical signal of the other wavelength λ2 is outputted from the third port P1003 (bar direction).

Due to the operation of the first grating 34A and the third grating 34C at the first stage (the first region 1012A and the third region 1014A), the first optical signal is divided into two at the exits (a fifth extremal value portion C1005 and a sixth extremal value portion C1006) of the first stage. In the second stage (the second region 1012B and the fourth region 1014B), there are the second grating 34B and the fourth grating 34D which have repeating patterns of phases opposite to those of the initial stage. Thus, through processes opposite to those of the first stage, the optical power is transferred to the second waveguide 1014, and as a result, the first optical signal is outputted from a fourth port P1004.

The first grating 34A and the third grating 34C are provided such that the entire second optical signal returns to the first waveguide 1012 at the exits of the first stage. In the second stage, the same processes are repeated, and as a result, the second optical signal is outputted from the third port P1003.

The optical wavelength filter 1010 has a grating reversing characteristic at the fifth extremal value portion C1005 and the sixth extremal value portion C1006. Therefore, the wavelength band width of the wave-split optical signal is wide. For example, even if the wavelength of the first optical signal fluctuates from λ1 to λ1+d(λ1), the optical power of the first optical signal outputted from the fourth port P1004 does not substantially decrease. Accordingly, the wave-splitting characteristic of the optical wavelength filter 1010 is stable. In other words, the transmission wavelength band of the optical wavelength filter 1010 is broad.

Generally, the element characteristic of a direction coupler is determined by the parameter δ/κ. The reason for this is that, in the following mode coupling equations $$\frac{dR(z)}{dz} = j \cdot \delta \cdot R(z) + \kappa \cdot S(z) \\ \frac{dS(z)}{dz} = -j \cdot \delta \cdot S(z) - \kappa \cdot R(z)$$ (3)

(wherein the direction orthogonal to the waveguide cross-section is the z direction; R(z) and S(z) are, with respect to the z direction, the amplitude of the propagation mode of the optical signal outputted from the third port P3 (or P1003) and the fourth port P4 (or P1004), respectively; j is an imaginary number; and δ and κ(z) will be explained later), if $$\xi = \delta \cdot z$$ (4), then equations (3) become $$\frac{dR(\xi)}{d\xi} = j \cdot R(\xi) + \frac{\kappa}{\delta} \cdot S(\xi) \\ \frac{dS(\xi)}{d\xi} = -j \cdot S(\xi) - \frac{\kappa}{\delta} \cdot R(\xi)$$ (5)

Thus, the solutions R(ξ) and S(ξ) of equations (5) are determined uniquely by the parameter δ/κ.

When the directional coupler is the wavelength filter 1010, δ is defined as:

$$\delta = \Delta\beta - 2\pi/\Lambda$$ (6).

Δβ is as defined by above formula (2). (Here, the Δn in formula (2) is the difference in equivalent refractive indices of the first waveguide 1012 and the second waveguide 1014. In this example, the waveguide widths of the first waveguide 1012 and the second waveguide 1014 are different) Further, Λ is one period of the grating cycle.

When the directional coupler is the optical switch 10, δ is defined as:

$$\delta = \Delta\beta$$ (7).

Δβ is as defined by above formula (2).

Further, when the direction coupler is the optical wavelength filter 1010, κ is a coupling coefficient which is defined by the overlapping integral of the propagation mode at each waveguide portion, and the amount of change Δ∈ in the dielectric constant of the waveguide and the clad portion (not illustrated). By using, for example, a reverse scattering method, the coupling coefficient at the optical wavelength filter 1010 can be optimized such that the wave-splitting characteristic is stable.

On the other hand, when the direction coupler is the optical switch 10, as described above, κ is a coupling coefficient which is defined by the overlapping integral of the propagation modes at the respective waveguide portions.

At the optical wavelength filter 1010, δ is fixed for each optical signal of each wavelength λ. The coupling coefficient κ includes the amount of change Δ∈ in the dielectric constant. The repeating pattern of polarities of the amount of change Δ∈ in the dielectric constant is reversed at the fifth extremal value portion C1005 and the sixth extremal value portion C1006. The reason for this is that, as described above, the repeating patterns of the phases of the grating are reversed at the fifth extremal value portion C1005 and the sixth extremal value portion C1006. As a result, the polarity of the parameter δ/κ is also reversed at the fifth extremal value portion C1005 and the sixth extremal value portion C1006. Due to this reversal, as described above, the wave-splitting characteristic of the optical wavelength filter 1010 is stable.

There is another method of reversing the polarity of the parameter δ/κ at the fifth extremal value portion C1005 and the sixth extremal value portion C1006. This is a method of reversing the polarity of δ at the fifth extremal value portion C1005 and the sixth extremal value portion C1006, and not reversing the polarity of the coupling coefficient κ as in the optical wavelength filter 1010. The optical switch 10 (in which the waveguide widths (core widths) of the first and second waveguides 12 and 14 are the same) actively utilizes the reversal of the polarity of δ.

In the optical switch 10, in order to reverse the polarity of δ at the fifth extremal value portion C5 and the sixth extremal value portion C6, the polarity of Δn may be reversed by formula (2). Namely, it suffices to reverse the polarities of the voltages applied to the first electrode 20A and the second electrode 20B, and to reverse the polarities of the voltages applied to the third electrode 20C and the fourth electrode 20D. As described above, in the present structural example, the reference potential of the voltages applied to the respective electrodes is the potential of the ground electrode 22.

As described above, as viewed in direction H, the phases of the first grating 34A and the third grating 34C are reversed, and the phases of the second grating 34B and the fourth grating 34D are reversed. Taking this into consideration, the polarity of δ at the fifth extremal value portion C5 and the sixth extremal value portion C6 can be reversed by reversing the polarities of the voltages applied to the first electrode 20A and the third electrode 20C and reversing the polarities of the voltages applied to the second electrode 20B and the fourth electrode 20D.

The optical switch 10 and the optical wavelength filter 1010 can achieve the same effects. Namely, the optical splitting characteristic of the optical wavelength filter 1010 is stable. In other words, the wavelength bands of the optical signals outputted in the cross direction and the bar direction are both wide. In the case of the optical switch 10 as well, the wavelength bands of the optical signals outputted in the cross direction and the bar direction are both wide. In the optical switch 10, the wavelength bands are controlled by the voltages applied to the respective electrodes 20A through 20D. Thus, the ranges of the bar voltage value and the cross voltage value can effectively be made wide. Namely, the operational ranges of the cross state and the bar state are simultaneously broad. Accordingly, switching to the cross state or to the bar state can be carried out stably.

There are optical wavelength filters 10 of the type in which, for example, the first waveguide 1012 does not have a grating whereas the second waveguide 1014 does have a grating (phase reversal structure). It is known that the wavelength band is wide in such an optical wavelength filter as well. Accordingly, in the same way as the above-described structural example, a stable characteristic of switching to the bar state and the cross state can be obtained theoretically even in an optical wavelength filter in which electrodes are used instead of the grating, and there are a plural electrodes at only one waveguide, and the phases of the electrodes are reversed. Further, even if the repeating pattern of the phases of the grating of the wavelength filter are not reversed, as long as the wavelength band of the wavelength filter is broad, a stable switching characteristic can be obtained by an optical switch which has been designed on the basis of the wavelength filter and in which the polarities of the voltages applied to the electrodes are not reversed.

Second Embodiment

A method of designing an optical switch from an optical wavelength filter, which is different from the method described above in the first embodiment, will be described hereinafter with reference to FIGS. 5 and 6.

Figure 5:
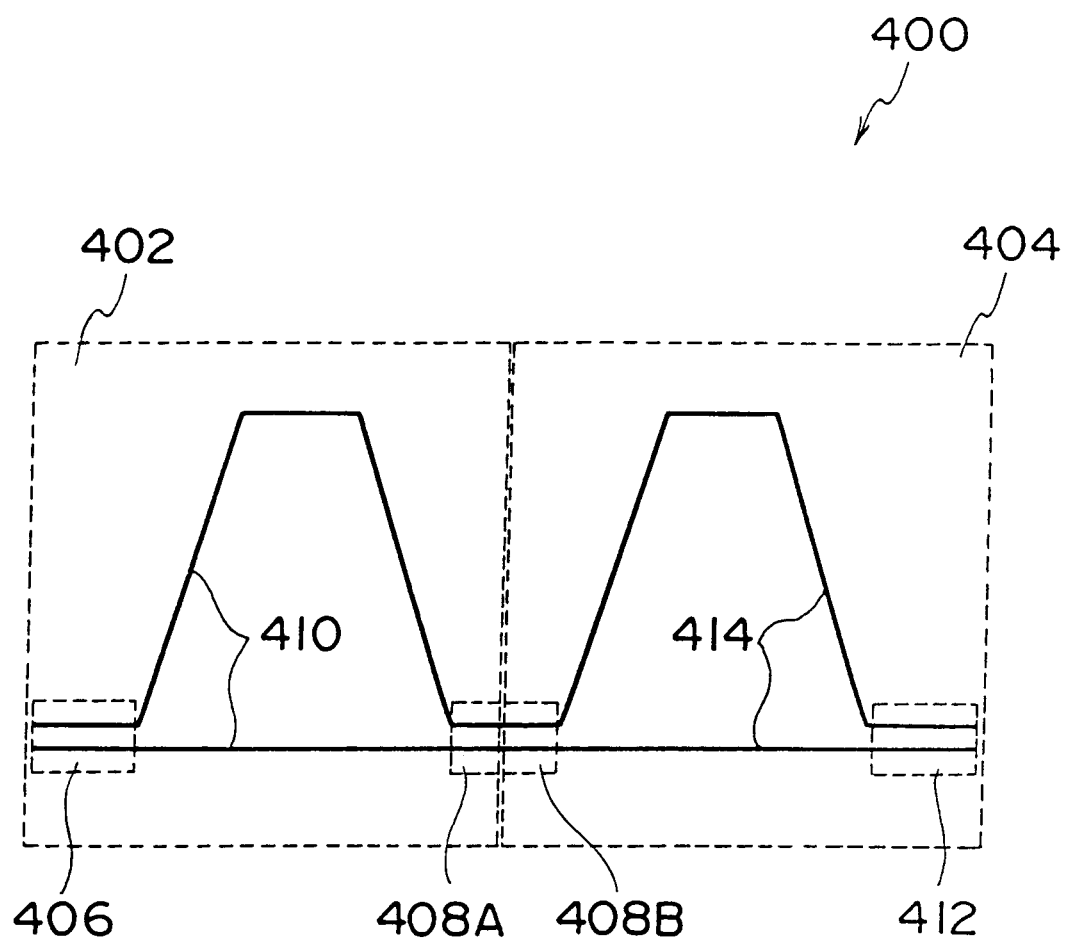
FIG. 5 is a plan view illustrating only waveguides of an optical wavelength filter.

FIG. 5 is a plan view of only waveguide portions of an optical wavelength filter.

Figure 6:
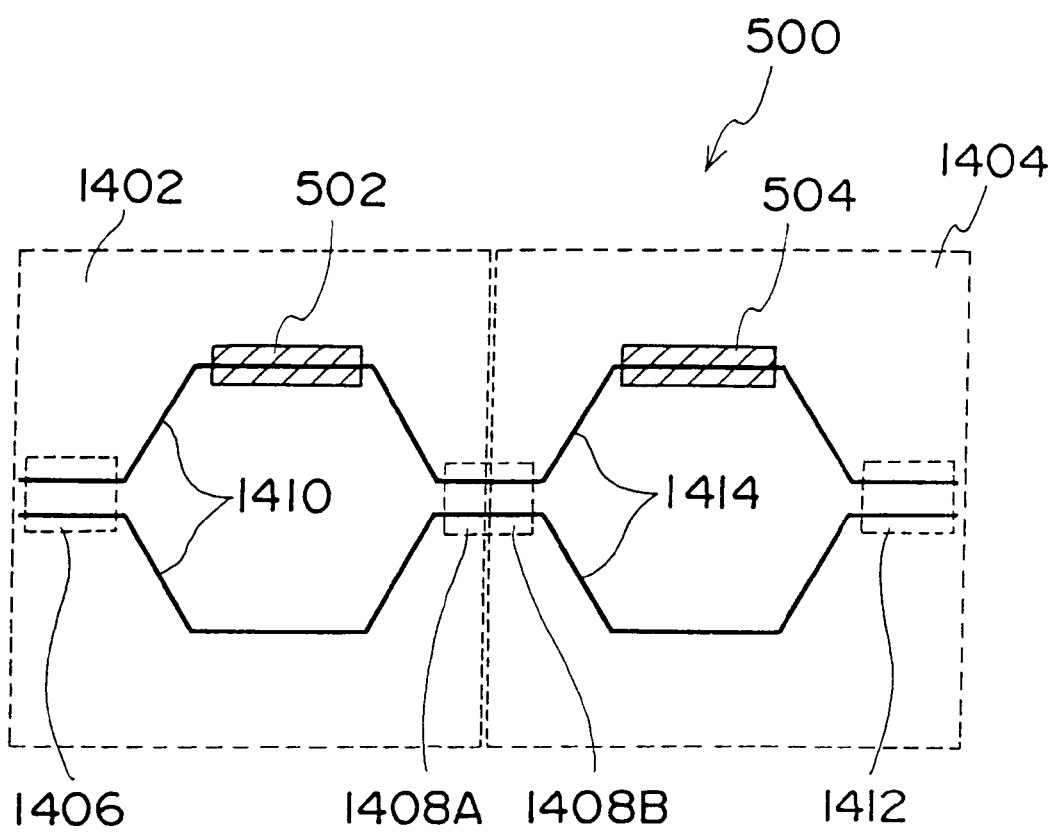
FIG. 6 is a plan view illustrating only waveguides and electrodes of an optical switch.
Figure 7:
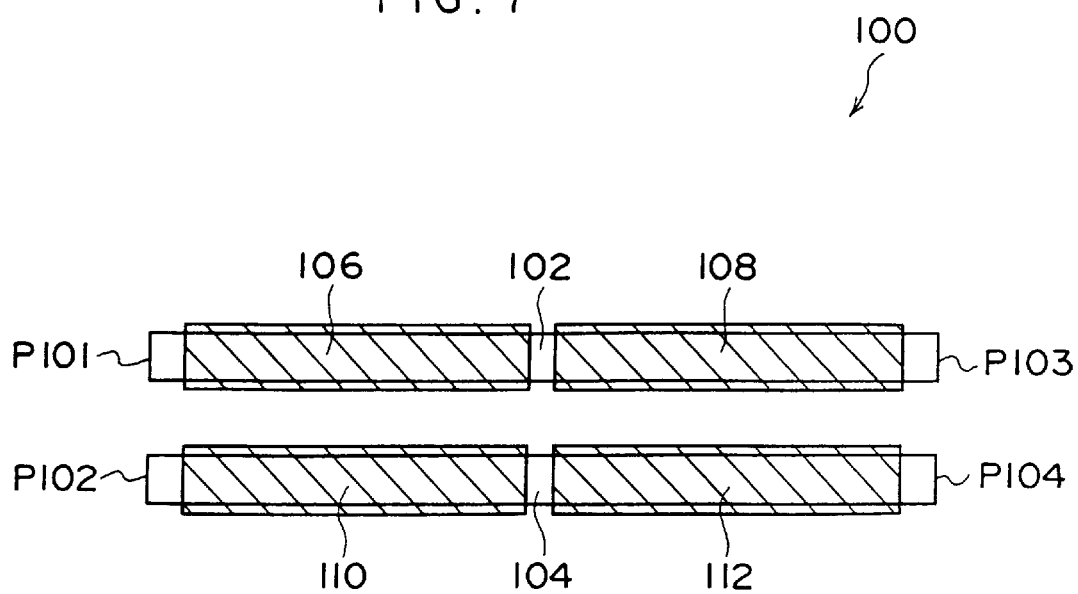
FIG. 7 is a plan view illustrating only waveguides and electrodes of an optical switch.

FIG. 6 is a plan view of only waveguide portions and electrode portions of an optical switch.

An optical wavelength filter 400 of FIG. 5 is a conventionally known optical wavelength filter in which Mach-Zehnder interferometer type optical wavelength filter elements (hereinafter "filter elements") 402 and 404 are connected in series.

The filter element 402 includes two direction couplers 406 and 408A, and a first arm waveguide 410 which connects the direction couplers 406 and 408A. The first arm waveguide 410 is a waveguide of non mode coupling regions. The filter element 404 includes two direction couplers 408B (connected to the direction coupler 408A) and 412, and a second arm waveguide 414 which connects the direction couplers 408B and 412. The second arm waveguide 414 is a waveguide of non mode coupling regions.

The optical path length of one of the waveguides forming the first arm waveguide 410 is longer than the optical path length of the other waveguide. Similarly, the optical path length of one of the waveguides forming the second arm waveguide 414 is longer than the optical path length of the other waveguide. Given that the difference in the optical path lengths of the two waveguides forming the first arm waveguide 410 (or the second arm waveguide 414) is ΔL, a phase difference of $$\beta \cdot \Delta L \tag{8}$$

arises in the optical signal propagated between the two waveguides forming the first arm waveguide 410 (or the second arm waveguide 414). Wave splitting of the inputted wavelength multiple signal is carried out by utilizing this phase difference. It is known that the transmission wavelength band of the optical wavelength filter 400 is broad.

A wide wavelength band can be obtained by using the difference in β instead of the difference in L. Namely, $$\Delta \beta \cdot L \tag{9}$$

The (conventionally known) optical switch 500 of FIG. 6 was designed in order to satisfy formula (9). The structures of the optical switch 500 are basically the same as the structures of the optical wavelength filter 400. When the structures are the same, the structural portions of the optical switch 500 will be designated by reference numerals which are those of the structural portions of the optical wavelength filter 400 to which 1000 has been added. (For example, the first arm waveguide 410 in the optical wavelength filter 400 corresponds to a first arm waveguide 1410 in the optical switch 500.)

In accordance with the structure of the optical switch 500, the lengths of the two waveguides forming the first arm waveguide 1410 are the same, and the lengths of the two waveguides forming a second arm waveguide 1414 are the same. Electrodes 502 and 504 are disposed along ones of the waveguides forming the first arm waveguide 1410 and the second arm waveguide 1414, respectively. By applying voltages independently to these electrodes 502 and 504, the refractive indices of the waveguide portions are varied (i.e., β is varied) and switching is carried out.

In this way, the optical switch 500 can achieve the same effects as the optical wavelength filter 400. Namely, the wave splitting characteristic of the optical wavelength filter 400 is stable. In other words, the wavelength bands of the optical signals outputted in the cross direction and the bar direction are broad. Accordingly, with the optical switch 500 as well, the wavelength bands of optical signals outputted in the cross direction and the bar direction are wide. In the optical switch 500, the wavelength band is controlled by the voltages applied to the electrodes 502 and 504. Therefore, the ranges of the bar voltage values and the cross voltage values are both wide. Namely, the operational ranges of the cross state and the bar state are both wide simultaneously. Accordingly, switching to the cross state or to the bar state can be carried out stably.

Generally, if the wavelength band of a wavelength filter using formula (8) is wide, switching carried out by an optical switch designed on the basis of formula (9) is stable.

The present invention is not limited to the above-described embodiments, and various changes can be added in accordance with the design.

For example, in the first embodiment, the configurations of the first, second, third and fourth unit curves 28A, 28B, 30A, and 30B were all substantially cycloid curves. However, these unit curves may be substantially sine curves.

Or, for example, in the first embodiment, the configuration of one of the first central line 28 and the second central line 30 can be a substantially straight line.

For example, in the first and second embodiments, each wave guide has two extremely small regions, but may have three or more extremely small regions.

As described above, by operating the optical switch having the structure of the present invention by the method of operation of the present invention, the operational ranges of both the bar state and the cross state are broad. Accordingly, switching to the bar state and switching to the cross state are both stable.

In accordance with the method of designing an optical switch of the present invention, an optical switch can be designed in which the operational ranges of the bar state and the cross state are both broad.

What is claimed is:

1. An optical switch for outputting an optical signal in different states, comprising:
   (a) first and second waveguides each including a propagation mode, the waveguides having a plurality of mode coupling regions permitting coupling between propagation modes and a plurality of non mode coupling regions where substantially no coupling arises between propagation modes of the waveguides, the mode coupling regions being opposing portions of the waveguides, and the non mode coupling regions also being opposing portions of the waveguides, wherein the opposing portions of the mode coupling regions are nearer to one another relative to the opposing portions of the non mode coupling regions; and
   (b) a plurality of variable voltage electrodes, each one of the variable voltage electrodes being provided at one of the plurality of mode coupling regions of at least one of the first and second waveguides, wherein a portion of each one of the mode coupling regions at which the first and second waveguides are closest to each other is overlapped by one of the plurality of variable voltage electrodes.

2. An optical switch according to claim 1, wherein said electrodes are disposed along said first waveguide and said second waveguide, with the electrodes disposed along said first waveguide opposing, in a one-to-one relationship, the electrodes disposed along said second waveguide.

3. An optical switch according to claim 1, wherein no electrode is provided at the non mode coupling regions.

4. An optical switch according to claim 1, wherein the waveguides substantially mirror one another.

5. An optical switch for outputting an optical signal in different states, the switch comprising:
   (a) first and second waveguides each including a propagation mode, the waveguides having a plurality of mode coupling regions permitting coupling between propagation modes and a plurality of non mode coupling regions where substantially no coupling arises between propagation modes of the waveguides, the mode coupling regions being opposing portions of the waveguides, and the non mode coupling regions also being opposing portions of the waveguides, wherein the opposing portions of the mode coupling regions are nearer to one another relative to the opposing portions of the non mode coupling regions, the first and second waveguides each including a periphery having at least one curve with a convex section, with the convex section of the curve of each waveguide opposing the convex section of the curve of the other waveguide; and
   (b) a plurality of electrodes spaced apart from one another, wherein said electrodes are disposed along at least said first and waveguide.

6. An optical switch according to claim 5, wherein the curve of each waveguide is substantially a cycloid curve.

7. An optical switch according to claim 5, wherein the curves are substantially sinusoidal.

8. An optical switch for outputting an optical signal in different states, the switch comprising:
   (a) first and second waveguides each including a propagation mode, the waveguides having a plurality of mode coupling regions permitting coupling between propagation modes and a plurality of non mode coupling regions where substantially no coupling arises between propagation modes of the waveguides, the mode coupling regions being opposing portions of the waveguides, and the non mode coupling regions also being opposing portions of the waveguides, wherein the opposing portions of the mode coupling regions are nearer to one another relative to the opposing portions of the non mode coupling regions, at least one of the waveguides including a periphery having at least one curve; and
   (b) a plurality of electrodes spaced apart from one another, wherein said electrodes are disposed along at least said first waveguide.

9. An optical switch according to claim 8, wherein curve is substantially sinusoidal.

10. An optical switch according to claim 8, wherein the curve is substantially a cycloid curve.

11. A method for operating an optical switch for outputting a signal in different states, the optical switch having first and second waveguides with a plurality of portions opposing one another across a space, with the space between one opposing portion being less relative to the space between another opposing portion, and a plurality of electrodes disposed apart from one another, said method comprising the steps of:
   (a) applying voltages independently to each of the electrodes; and
   (b) successively reversing polarities of said electrodes in an order in which said electrodes are disposed.

12. A method of operating an optical switch according to claim 11, wherein the step of applying voltages includes applying voltages that are substantially equal.

13. A method for designing an optical switch from an optical wavelength filter having at least one electrode and first and second waveguides with a plurality of portions opposing one another across a space, with the space between one opposing portion being less relative to the space between another opposing portion, at least one of the waveguides having a section with a relief-type grating structure, and another section with a relief-type grating structure reversed relative to the other grating structure for optical-wave splitting, said method comprising the steps of:
   (a) for said section with a relief-type grating structure that is not reversed, replacing the grating structure with an electrode; and
   (b) reversing a voltage potential applied to each electrode in accordance with the reversed relief-type grating structure.

14. A method for designing an optical switch from a direction coupler type optical wavelength filter having a first waveguide and a second waveguide, each waveguide having a non mode coupling region with a length, said length being different in each waveguide, said method comprising the steps of:
   (a) modifying the filter to have first and second waveguides of substantially the same length in the non mode coupling regions;
   (b) placing electrodes along at least one of the waveguides; and
   (c) independently controlling voltages applied to the electrodes.

* * * * *